United States Patent
Willmann

(10) Patent No.: US 10,862,982 B2
(45) Date of Patent: *Dec. 8, 2020

(54) CLOUD-SCALE HETEROGENEOUS DATACENTER MANAGEMENT INFRASTRUCTURE

(71) Applicant: VMware, Inc., Palo Alto, CA (US)

(72) Inventor: Paul Willmann, Weymouth, MA (US)

(73) Assignee: VMWARE, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/238,621

(22) Filed: Jan. 3, 2019

(65) Prior Publication Data

US 2019/0141145 A1 May 9, 2019

Related U.S. Application Data

(63) Continuation of application No. 14/010,070, filed on Aug. 26, 2013, now Pat. No. 10,187,479.

(51) Int. Cl.
*H04L 29/08* (2006.01)
*G06F 9/54* (2006.01)

(52) U.S. Cl.
CPC .............. *H04L 67/18* (2013.01); *G06F 9/544* (2013.01); *G06F 9/545* (2013.01)

(58) Field of Classification Search
CPC ........... H04L 67/18; G06F 9/544; G06F 9/545
See application file for complete search history.

(56) References Cited

U.S. PATENT DOCUMENTS

| | | | |
|---|---|---|---|
| 7,448,049 B1 | 11/2008 | Xing | |
| 7,865,893 B1 * | 1/2011 | Omelyanchuk | G06F 11/3644 710/1 |
| 7,895,309 B2 | 2/2011 | Belali et al. | |
| 8,209,704 B1 * | 6/2012 | McCann | G06F 9/545 711/130 |
| 8,271,996 B1 | 9/2012 | Gould et al. | |
| 8,555,297 B1 | 10/2013 | Gould et al. | |
| 9,612,877 B1 | 4/2017 | Noll et al. | |
| 2003/0014521 A1 | 1/2003 | Elson et al. | |
| 2004/0148609 A1 | 7/2004 | Jimenez et al. | |
| 2006/0107020 A1 * | 5/2006 | Stillwell, Jr. | G06F 12/109 711/203 |

(Continued)

FOREIGN PATENT DOCUMENTS

WO 9719402 5/1997

OTHER PUBLICATIONS

Edge, "Character devices in user space", Nov. 25, 2008, pp. 1-4.*
Keller, "kernel user space how to", Sep. 28, 2008, pp. 1-12.*

*Primary Examiner* — Doon Y Chow
*Assistant Examiner* — Phuong N Hoang
(74) *Attorney, Agent, or Firm* — Thomas | Horstemeyer, LLP

(57) ABSTRACT

Disclosed are aspects of communication between user-space and kernel-space. In some examples, an application programming interface (API) signature is defined for an API. The API signature specifies a callback and a callback parameter size. A transport allocates temporary storage based on the callback parameter size specified by the API signature. A callback parameter is stored in the temporary storage. The callback is invoked based on the callback parameter.

20 Claims, 4 Drawing Sheets

(56) References Cited

U.S. PATENT DOCUMENTS

| | | |
|---|---|---|
| 2008/0127292 A1 | 5/2008 | Cooper et al. |
| 2010/0223613 A1* | 9/2010 | Schneider ........... G06F 9/45558 718/1 |
| 2010/0318992 A1 | 12/2010 | Kushwaha et al. |
| 2012/0033673 A1 | 2/2012 | Goel |
| 2012/0179874 A1 | 7/2012 | Chang et al. |
| 2013/0347131 A1 | 12/2013 | Mooring et al. |
| 2014/0201357 A1* | 7/2014 | Tang ....................... H04L 43/50 709/224 |
| 2014/0201424 A1 | 7/2014 | Chen et al. |
| 2015/0067674 A1 | 3/2015 | Melander et al. |

* cited by examiner

CLOUD-SCALE HETEROGENEOUS DATACENTER MANAGEMENT INFRASTRUCTURE

CROSS-REFERENCE TO RELATED APPLICATIONS

This application is a continuation of co-pending U.S. Non-Provisional patent application Ser. No. 14/010,070, filed on Aug. 26, 2013, and entitled "Cloud-Scale Heterogeneous Datacenter Management Infrastructure," which is incorporated herein by reference in its entirety.

BACKGROUND

Communication between components in the user space and the kernel space of an operating system is a known issue in datacenter management. This is especially a challenge for third-party software vendors who develop management software, drivers, modules, network interfaces, etc., for scalable computing platforms.

For example, in the area of cloud computing, host-management facilities are becoming critical architecture components as cloud deployments become increasingly scalable. In turn, the host-management facilities must also be scalable. The Common Information Model (CIM) architecture combined with host-inventory services allows an administrator to issue management operations from a single station to hosts and to have the operations serviced by vendor-specific CIM Provider software on each host. However, although the CIM architecture allows third-party developers to formally define the host-to-client interfaces supported by the CIM provider, the CIM architecture provides no guidance for defining the provider-to-kernel interface required to service the provider operations.

Further, in a virtualization platform, the primary method for third-party developers to implement user-space to kernel-space communication is through character devices. Character devices appear as file nodes in a file system and support traditional file operations (e.g., open, read, write, poll, ioctl, close, etc.). Kernel modules exporting character device interfaces register a series of file operations handlers. Thus, a user-space application performing a file operation on a file corresponding to the node in the file system triggers the character device interface.

One problem in working with character devices directly is a lack of structure and consistency in working with the low-level semantics. That is, many developers write their own (and often functionally equivalent or similar) interfaces ad hoc and implement common low-level transport operations and protocols (e.g., request decoding, parameter marshalling, and event delivery) to simply call a function inside kernel-space (or vice versa, to simply call a function inside user-space from the kernel-space). Typically, such interfaces require low-level bit manipulation and offer very limited methods of communication between kernel-space and user-space. In addition, because of the difficulty in programming low-level operations, the resulting application may be error-prone. Although it is possible to implement communications through file interfaces and socket interfaces, both approaches also have the fundamental constraint of being unable to send structured semantic data and operations across the user and kernel boundary. Like with character devices, using file interfaces and socket interfaces require that software on both sides pack and unpack the data.

Further, in the virtualization environment, because access to the kernel may be via the file system of the host computer, the applications that developers write to talk to the kernel are exposed to the file system. This limits portability for the management applications outside of the virtualization environment, which is already commonly constrained and may have little support for rich user applications. Also, complicated applications may use resources that can hinder the host computer's ability to efficiently run and manage virtual machines.

Additionally, the application programming interfaces (APIs) that third-party developers build on character devices (or even file interfaces and socket interfaces) lack inherent support for versioning, resulting in compatibility issues between user components and kernel components as time passes and later API versions are implemented. For example, a CIM provider from a particular third-party vendor may need to support multiple drivers, but the driver itself may evolve over time to add new features, such as after a firmware upgrade. In such a case, the CIM provider has no way to detect what high-level operations built on the low-level interfaces are supported. Current solutions are cumbersome and lead to breakage when a data structure definition changes even slightly. Presently, to prevent breakage and maintain compatibility, kernel- and user-space applications require tight integration and agreement.

SUMMARY

One embodiment presented herein includes a method for an operating system kernel to communicate with a user-space guest application. This method may generally include matching, in a data store that includes data for mapping registration handles to API signatures, a given registration handle to an associated API signature having at least one callback. The data store resides in a first transport residing in kernel-space. This method may also include retrieving, from the kernel, a descriptor corresponding to one of the at least one callback in the API signature and storing the descriptor in the first transport. This method may include sending the descriptor to a second transport residing in user-space. This method may include processing, via the second transport, the descriptor to the guest application.

Another embodiment includes a method of abstract communication between an application in an operating system kernel in a first host computer and a user-space guest application. This method may generally include matching, in a library in a first transport residing in user-space, a given registration handle to an associated API signature having at least one callback. This method may also include retrieving, from the guest application, a descriptor corresponding to one of the at least one callback in the API signature. This method may also include storing the descriptor in the first transport and sending the descriptor to a second transport. The second transport resides in kernel-space. This method may also include processing, via the second transport, the descriptor, and parameters to the kernel.

DETAILED DESCRIPTION

Figure 1:
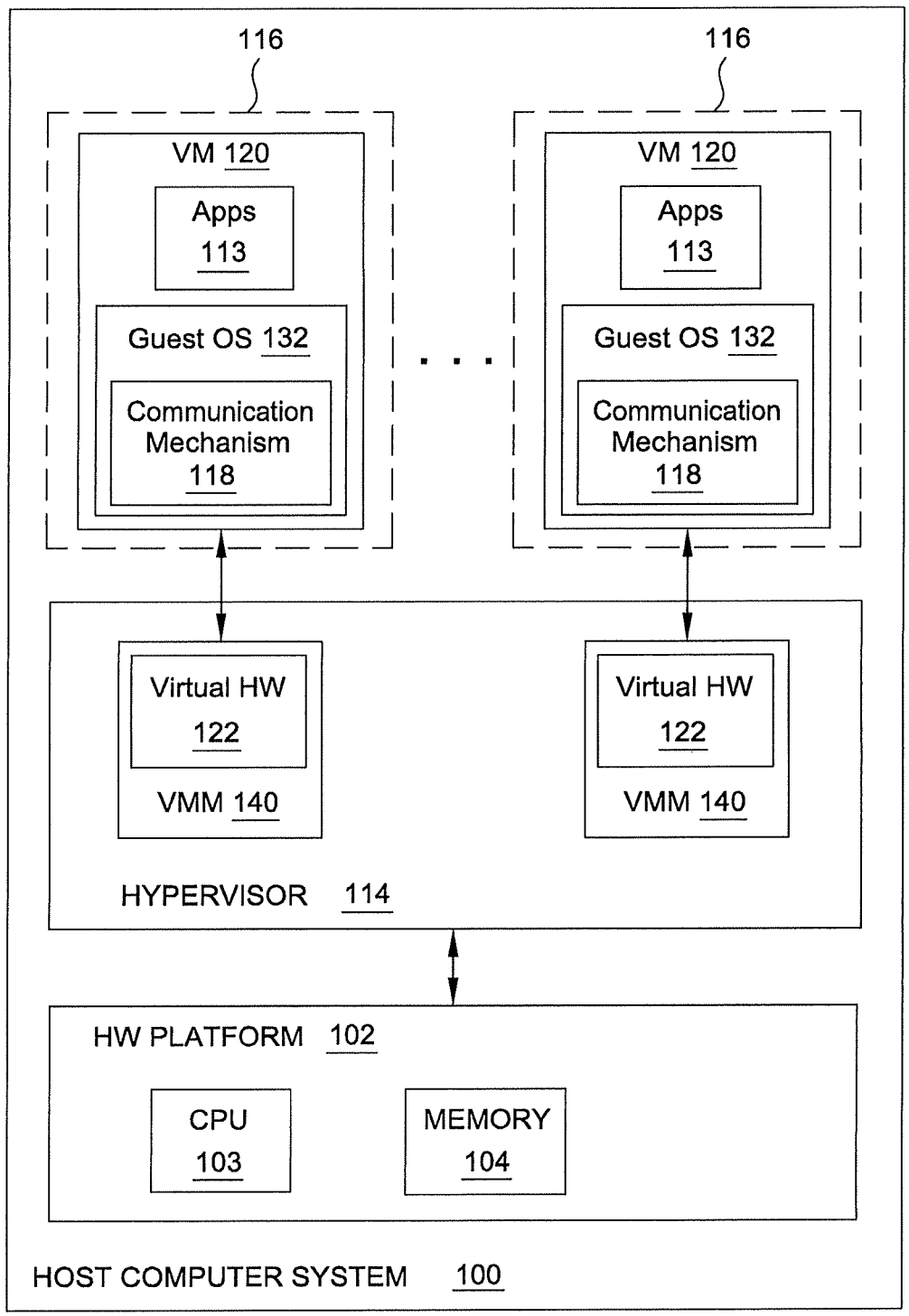
FIG. 1 illustrates an example block diagram of a host computer system in a virtualization environment configured with the kernel-to-user communication mechanism, according to one embodiment.

Embodiments disclosed herein provide high-level primitives for communication between kernel modules and user-space applications. In one embodiment, a communication mechanism copies callback parameters, handles asynchronous delivery, and ensures that the user-space and kernel-space components are using a compatible application programming interface (API) version. Transport components of the communication mechanism reside in user-space and kernel-space to allow a user-space application and kernel-space module to appear to communicate directly with one another (e.g., in invoking callbacks). Further, embodiments provide a definition standard that developers use to automatically emit a header file and macros for sending events and dispatching callbacks.

For example, in a virtualized computing environment that includes a clustered network of host computer nodes that launch and run virtual machines, third-party developers write applications that require communication with the hypervisor kernel. Generally, to implement these applications, developers have to implement common transport operations to retrieve information from and provide information to the kernel (e.g., many user-space applications that perform debugging or parameterization requires specifically communicating with the kernel).

The provided communication mechanism facilitates communication between a user-space application and an operating system kernel. Using this mechanism, developers may define management operations that can perform at runtime (either in the kernel or in the application) without needing to program common transport operations that require low-level bitwise operations. Further, because the mechanism allows for multiple API version support, third-party user-space application developers and kernel module developers are less restricted by coupling requirements and are able to unilaterally pursue future implementations.

In one embodiment, a kernel that communicates with a compatible user-space component registers management APIs with the transport module. To invoke a user-space callback, code in the kernel module invokes the transport API, passing as parameters the registered API handle, the callback identifier to be invoked, and the parameters to the callback. When the module is unloaded, the module invokes the transport API with each registered handle to unregister the API instances from the transport. Similarly, a user-space application that communicates with a kernel module registers the API signature with the user-space transport. If successful, an opaque handle is passed back. The application uses this handle when invoking callbacks in kernel-space. When the application closes, the kernel-space transport detects the closure and cleans up any remaining state in the kernel.

In one embodiment, the communication mechanism also provides support for multiple API versions. That is, the provided framework allows applications to associate a version with a particular API signature. For instance, consider the case of a guest application that regularly retrieves network statistics from a kernel driver. Both the driver and the application might evolve over time when developers update either the driver or the application. For instance, new iterations of the driver may support additional operations or may require different operation semantics. These new features may render older versions of user-space applications obsolete (and vice versa) until the release of a newer version of the application, which can take time or necessitate tight coupling between the application and the driver. However, the communication mechanism reduces such concerns.

Continuing the previous example, assume that there are two versions of the kernel driver: version 1.0 and version 2.0. The newer version 2.0 provides support for additional operations. Typically, developers of user-space applications that communicate with this driver would be required to update the applications to be able to communicate with version 2.0 of the driver. However, there may be situations where a developer still wants to support software that communicates with version 1.0. In one embodiment, the kernel module can simultaneously register two variants of the API signature: one with a version 1.0 handle and another with a version 2.0 handle. Thereafter, at runtime, the system automatically resolves which handle and which semantics are associated with which software. Under this approach, this may result in different functions in the kernel that support semantics for different versions of a user-space application. At runtime, the kernel-space transport handles requests without regard for querying for a specific version.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One having skill in the art will readily recognize from the following description that alternative embodiments of the structures and methods illustrated herein may be employed without departing from the principles described herein.

In the following, reference is made to the embodiments being practiced in a virtualization environment. Such reference is set forth to provide a thorough understanding of the embodiments described herein. However, it will be apparent to one having skill in the art that these embodiments are applicable in other computing environments. Similarly, numerous specific details are provided to provide a thorough understanding of the embodiments. One having skill in the art will recognize that the embodiments may be practiced without some of these specific details. In other instances, well known process operations and implementation details have not been described in detail to avoid unnecessary obscuring novel aspects of the disclosure.

FIG. 1 illustrates an example block diagram of a host computer system 100 in a virtualization environment that is configured with the kernel-to-user communication mechanism, according to one embodiment. Host computer system 100 may be constructed on a desktop, laptop, or server grade hardware platform 102, such as an x86 architecture platform. Hardware platform 102 includes one or more central processing units (CPU) 103, host physical memory 104, and other standard hardware components such as network interface controllers that connect host computer system 100 to a network and one or more host bus adapters that connect host computer system 100 to a persistent storage device. In one embodiment, host computer system 100 is a VMWare ESXi host.

Hardware platform 102 includes a hypervisor 114. Hypervisor 114 supports multiple virtual machine execution spaces 116, wherein a VM process may be executed to instantiate corresponding VMs 120. For each VM 120, hypervisor 114 manages a corresponding virtual hardware platform (i.e., virtual hardware platforms 122) that includes emulated hardware such as virtual CPUs and guest physical memory. Each virtual hardware platform 122 supports the installation of a guest operating system (OS) (e.g., guest OS 132). In each instance, guest OS 132 provides user-level applications running in the virtual machine, e.g., apps 113, an interface to the virtual hardware platform of the virtual machine.

It should be recognized that the various terms, layers, and categorizations used to describe the virtualization components in FIG. 1 may be referred to differently without departing from their functionality or the spirit or scope of the disclosure. For example, virtual hardware platforms 122 may be considered part of virtual machine monitors (VMM) 140 that implement the virtual system support needed to coordinate operations between hypervisor 114 and the respective VMs. Alternatively, virtual hardware platforms 122 may also be considered separate (e.g., as a component of its corresponding virtual machine since such platforms include the hardware emulation components for the virtual machine) from VMMs 140, and VMMs 140 may be considered to be separate from hypervisor 114. One example of hypervisor 114 that may be used is included as a component of VMware's vSphere product, which is commercially available from VMware, Inc. of Palo Alto, Calif. It should be further recognized that other virtualized computer systems are contemplated, such as hosted virtual machine systems, where the hypervisor is implemented in conjunction with a host operating system.

Illustratively, guest OS 132 also includes a communication mechanism 118. Communication mechanism 118 is a high-level infrastructure that allows user-space applications to communicate with the kernel and vice versa, such as in a callback invocation. Mechanism 118 intercepts data sent to and from user-space applications and the kernel and performs the low-level character device operations needed to perform a callback or send an event across user-space or the kernel.

In another embodiment, communication mechanism 118 may be located in hypervisor 114 (e.g., within a VMM 140). For that matter, the abstraction provided by the communication mechanism allows a user-space application (e.g., management software) to run either in a virtual machine's guest OS 132, within hypervisor 114, or remotely as part of a management platform. Regardless of the location, communication mechanism 118 nevertheless provides the same semantics as if the application were communicating on-host with a kernel module. This approach lowers the barrier to writing scalable management applications for a datacenter. In addition, by implementing mechanism 118 in guest OS 132 instead of placing the mechanism within hypervisor 114, any management application that requires access to the kernel does not have to access the file system of host computer system 100 to do so. Further, this approach frees resources for host computer server 114 to manage VMs 112.

Figure 2:
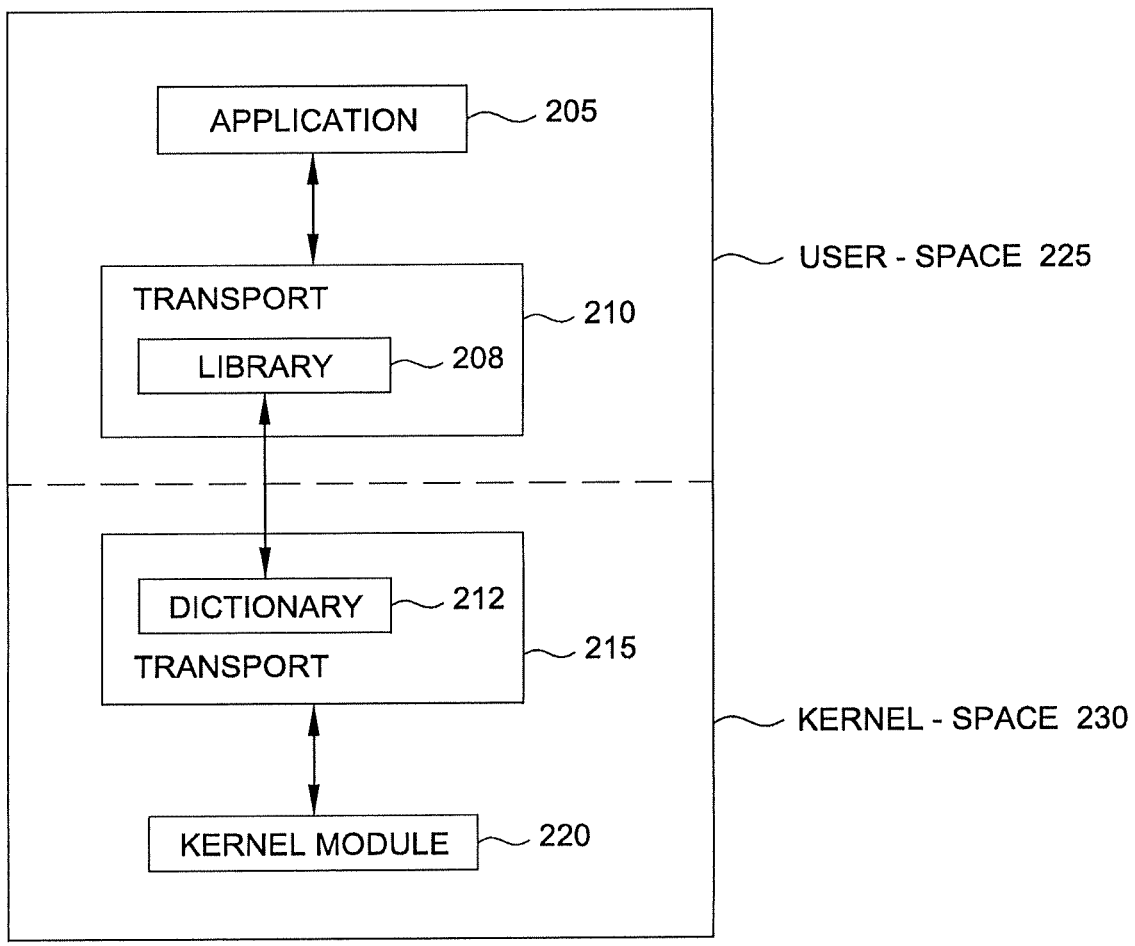
FIG. 2 illustrates an example layout of the communication mechanism in the user-space and kernel-space of the host computing system, according to one embodiment.

FIG. 2 illustrates an example layout of the communication mechanism in the user-space 225 and kernel-space 230 of a host computing system 200, according to one embodiment. Illustratively, an application 205 resides in user-space 225 and a kernel module 220 resides in kernel-space 230. The communication mechanism may include a user-space transport 210 and a kernel-space transport 215 to facilitate communication between an application 205 in user-space 225 and a kernel module 220 in kernel-space 230. Using the communication mechanism, a user-space application 205 and a kernel module 220 can communicate as if directly invoking callbacks. More specifically, transport 210 and transport 215 may copy parameters, handle asynchronous event delivery, and ensure that components in user-space 225 and kernel-space 230 are using compatible API versions.

A third-party developer writing an application that uses the communication mechanism initially defines an API signature that is recognizable to the transport components 210 and 215. The API signature enables a user-space or kernel-space application to use the mechanism. In one embodiment, the API signature may include a name, a version, a list of callbacks that can be invoked, whether the callback resides in user-space or kernel-space, whether each callback is synchronous or asynchronous, the amount of parameters for each callback, whether a parameter is an input, output, or input/output parameter, and the size of each parameter. In addition, the API may also include a version-matching kernel callback that allows the kernel module to specify compatible versions of the user-space API.

At initialization, kernel module 220 registers the management APIs with kernel-space transport 215. In one embodiment, the communication mechanism may support multiple APIs of different types simultaneously. For example, kernel module 220 may register and service a configuration and reporting API in addition to a vendor-specific API. As another example, a single driver may support two versions of the same API (e.g., to add support for a later version of user-space applications that use a new version of the API). Similarly, user-space application 205 registers APIs with user-space transport 210. In either case, when an application 205 or kernel module 220 registers an API signature, the transport 210 or 215, respectively, returns an opaque registration handle. To use the communication mechanism, the application passes the handle as a parameter during callback invocation.

In one embodiment, the communication mechanism supports M-to-N communication between M user-space applications and N kernel modules. For example, an application, in sending a request to a specific kernel module, passes a callback identifier as a parameter in the API signature. M-to-N communication facilitates delivering asynchronous events from the kernel (e.g., in situations where a driver must broadcast an event).

In one embodiment, the communication mechanism may be implemented using character device nodes in the file system of the host computer. To do this, kernel-space transport 215 registers one character device node per instance. For example, a single driver registering three APIs may register three device nodes. In turn, user-space transport 210 identifies character device nodes in the file system that match the name and major version of the API. In one embodiment, user-space transport 210 may determine a partial match by querying a dictionary 212 located in the kernel-space transport 215, which provides available API names, vendors, versions, and corresponding files. Once a given file is opened, library 208 in user-space confirms (i.e., does a handshake) with the kernel that the version information is as requested. Upon determining a match, user space transport 210 keeps the file descriptor to the corresponding character device open, creates a thread to listen for incoming events from the kernel, and returns a handle that describes the file descriptor. In an alternative embodiment, the communication mechanism may be implemented using other kernel-to-user protocols, such as kernel and user sockets.

In one embodiment, user-space transport 210 includes a library 208. Application 205 communicates with library 208, and library 208 in turn communicates with kernel-space 230.

Library 208 maintains listeners for character device nodes that are opened by application 205. Upon detecting data intended for user-space application 205 from kernel-space transport 215, library 208 is responsible for reading and validating the data to ensure proper form before unloading the data for user-space application 205. In addition, library 208 maintains a mapping of registration handles to character device nodes. In another embodiment, registration handles may map to the kernel by other means, such as through kernel mapping or VMware VMKernel System Information (VSI) nodes.

To access kernel-space 230, user-space application 205 links to library 208 and communicates through a dictionary 212 residing in kernel-space transport 215. In one embodiment, dictionary 212 is a data store that maintains a listing of registered API definitions that specify operations provided by the API. To do this, dictionary 212 maps registration handles to corresponding API signatures. User-space transport 210 may communicate with dictionary 212 by linking library 208 to dictionary 212 to identify supporting API signatures. Similarly, a kernel-space application may use handles provided by dictionary 212 internally to identify any applications associated with the handle.

Figure 3:
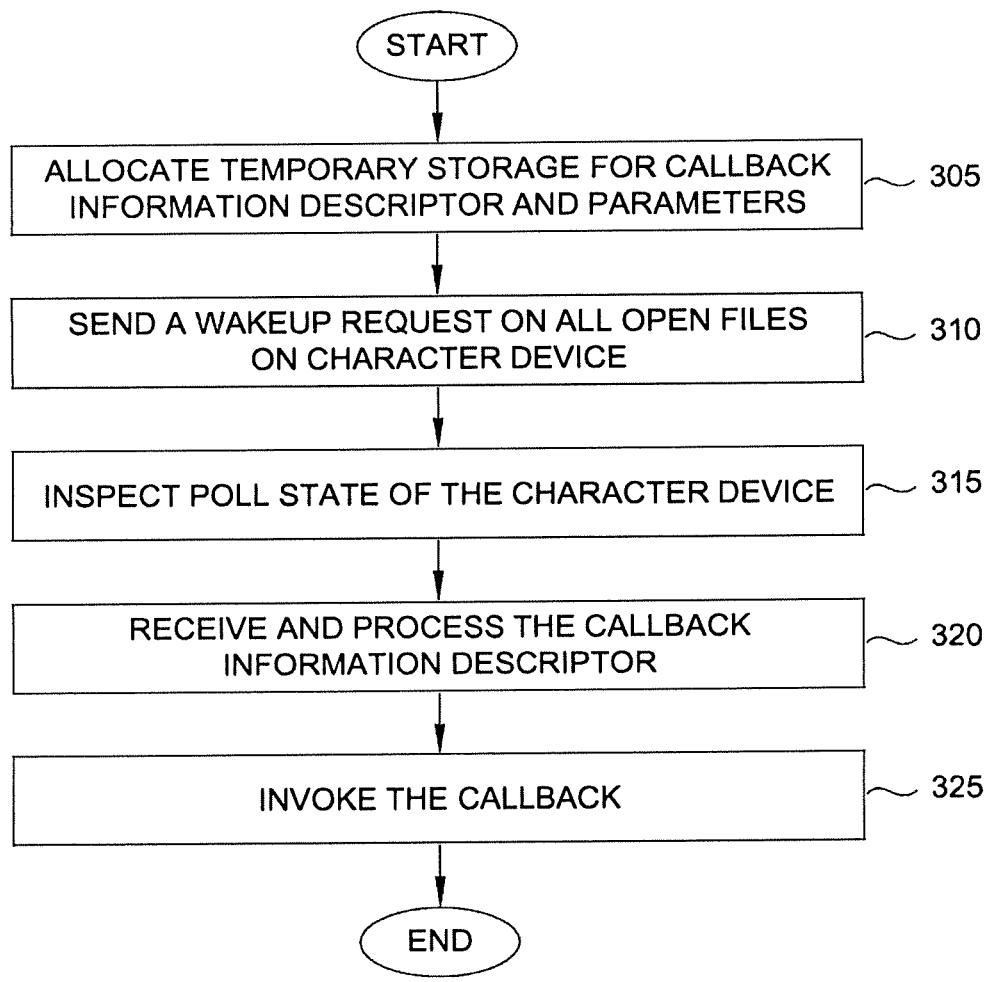
FIG. 3 illustrates a method diagram for invoking callback in user-space from kernel-space using the communication mechanism, according to one embodiment.

FIG. 3 illustrates a method diagram for invoking a callback in user-space from kernel-space of a host computing system, according to one embodiment. The callback structure includes a callback information descriptor and parameters. The callback information descriptor may describe the semantics of the parameters and the function that runs as a result of the callback. The semantics may include the number of parameters, the size of each parameter, and an indicator of how the memory used to pass the parameters should be allocated. The semantics may also include whether the parameters are input, input/output, or output. For example, if the semantics describe the parameter as an input parameter, then the callee (i.e., the user-space application) should receive data after the callback is invoked. As another example, if the semantics describe as an input/output parameter, the callee may modify data after receiving the data and before sending the data back to the caller. Alternatively, if the semantics describe an output parameter, the callee should produce data and output the data to the caller.

The method begins at step 305, where the kernel-space transport allocates temporary storage for a callback information descriptor and parameters. The kernel-space module copies the callback information descriptor and parameters into the temporary storage and presents the parameters as pointers to the callee. At step 310, after the descriptor and parameters have been copied to the kernel-space transport, the transport sends a wakeup request on all open files associated with the character device being used for the kernel side of the API instance. Doing this wakes all sleeping threads in the user-side transport that are waiting for events. In an alternative embodiment, the callback parameters may be of variable length, where invoking the parameter encodes the number of elements within each parameter. In this case, instead of passing a pointer to the data, the kernel-space module passes a pointer to a descriptor that includes an indicator for the number of elements and a pointer to the beginning of the data.

At step 315, the user-space transport inspects the poll state of the character device to determine whether the character device is readable (i.e., an event is available). At step 320, the user-space transport reads the callback request, processes the request, and reads the parameters corresponding to the callback. At step 325, the user-space transport then dispatches the callback to effectively deliver the event inside the listening thread and invoke the callback.

Figure 4:
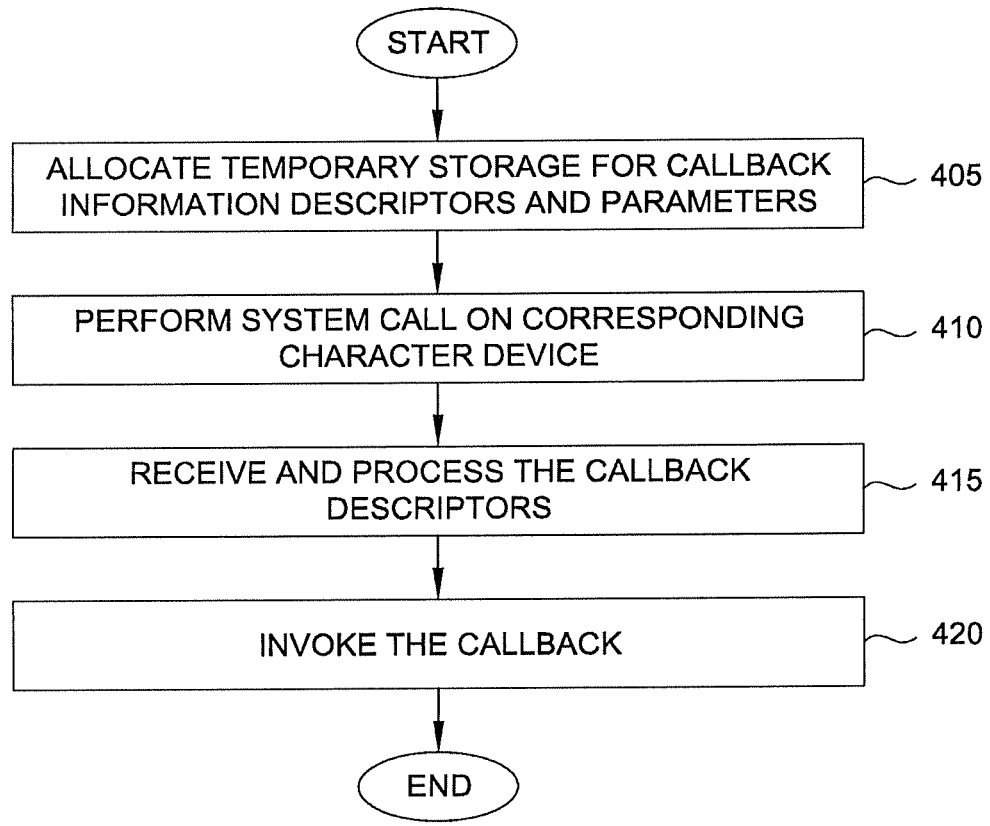
FIG. 4 illustrates a method diagram for invoking a callback in kernel-space from user-space using the communication mechanism, according to one embodiment.

FIG. 4 illustrates a method diagram for invoking a callback in kernel-space from user-space in the host computing system, according to one embodiment. As stated, when a user-space application registers an API signature, the kernel-space transport, using a dictionary maintaining API definitions and operations, returns an opaque handle that is mapped in user-space and kernel-space to the API signature. The library ensures a connection to the kernel and also verifies that the requested driver or module exists. At step 405, upon validating the parameters, the user-space transport allocates temporary storage for the callback information descriptors and the parameters. In one embodiment, the transport allocates the storage based on the specified size of the parameters as defined in the corresponding API signature.

At step 410, after allocating temporary storage, the user-space transport performs a system call on the underlying character device (or devices). The type of system call may depend on whether the callback invocation is asynchronous or synchronous. In one embodiment, for an asynchronous callback invocation, the user-space transport may perform a write command on the character device. In this case, before the user-space transport performs the write command, the transport builds a callback descriptor header. In one embodiment, the header encodes the callback identifier to be invoked and parameter semantics (e.g., parameter count and sizes that follow the header). For a synchronous callback invocation, the user-space transport may perform an ioctl command on the character device (in which case, the callback descriptor is encoded in an ioctl request). This enables the user-space transport to copy the output and input/output parameters from the kernel once the kernel dispatches and executes the callback. At step 415, the kernel-space transport implements the system call handlers for the underlying character device to receive and process callback descriptors. At step 420, the kernel-space transport unpacks the data and invokes the callback.

As described, embodiments disclosed herein provide an infrastructure that allows third-party developers to define desired management operations to be performed at runtime, either in kernel-space or user-space. The communication mechanism connects transport components residing in the kernel-space and the user-space at runtime and provides high-level, callback-style semantics for performing operations. Advantageously, this approach provides the appearance and abstraction of invoking a function as if a function-call. Further, the thorough definition of the interface reduces the need of component software (e.g., applications and kernel modules) to manipulate bits or data types on either side of the function-call abstraction. Additionally, infrastructure's versioning capability also reduces the need for user-space and kernel-space applications to be tightly coupled for compatibility.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

Therefore, the following is claimed:

1. A computer-implemented method, comprising:
defining an application programming interface (API) signature for an API, the API signature specifying at least: a callback, and a callback parameter size;
querying, by a user-space transport, a kernel-space dictionary to identify a match between the API signature and an API registration with the user-space transport;
creating, in response to the match between the API signature and the API registration, a thread that listens for events associated with a character device;
allocating, by a kernel-space transport that resides in kernel-space, temporary storage based on the callback parameter size specified by the API signature;
storing, in the temporary storage, a callback parameter; and
invoking the callback based on the callback parameter, the callback being invoked by the user-space transport based on identification of an event associated with the character device.

2. The method of claim 1, further comprising:
transmitting, by the kernel-space transport, a wakeup request that wakes up at least one sleeping thread maintained by a user-space library of the user-space transport, wherein the wakeup request is transmitted after the callback parameter is stored, and the at least one sleeping thread comprises the thread that listens for events associated with the character device.

3. The method of claim 1, further comprising:
determining, by the user-space transport, that an event is available based on an inspection of a poll state of the character device.

4. The method of claim 1, wherein the kernel-space transport and the user-space transport comprise a communication mechanism that allows user-space applications to communicate with kernel-space modules.

5. The method of claim 4, wherein the communication mechanism is part of a guest operating system of a virtual machine.

6. The method of claim 4, wherein the communication mechanism is part of a virtual machine manager of a hypervisor.

7. The method of claim 4, wherein the API signature is one of a plurality of API signatures registered in association with a single kernel-space driver.

8. A non-transitory computer-readable medium comprising executable instructions, wherein the instructions, when executed by at least one processor, cause at least one computing device to at least:
define an application programming interface (API) signature for an API, the API signature specifying at least: a callback, and a callback parameter size;
query, by a user-space transport, a kernel-space dictionary to identify a match between the API signature and an API registration with the user-space transport;
create, in response to the match between the API signature and the API registration, a thread that listens for events associated with a character device;

allocate, by a kernel-space transport that resides in kernel-space, temporary storage based on the callback parameter size specified by the API signature;

store, in the temporary storage, a callback parameter; and invoke the callback based on the callback parameter, the callback being invoked by the user-space transport based on identification of an event associated with the character device.

9. The non-transitory computer-readable medium of claim 8, wherein the instructions, when executed by the at least one processor, further cause the at least one computing device to at least:

perform, by the user-space transport, a system call on the character device associated with the API signature; and implement, by the kernel-space transport, a system call handler for the character device to obtain the callback parameter.

10. The non-transitory computer-readable medium of claim 8, wherein the kernel-space transport and the user-space transport comprise a communication mechanism that allows user-space applications to communicate with kernel-space modules.

11. The non-transitory computer-readable medium of claim 10, wherein the communication mechanism is part of a guest operating system of a virtual machine.

12. The non-transitory computer-readable medium of claim 10, wherein the communication mechanism is part of a virtual machine manager of a hypervisor.

13. The non-transitory computer-readable medium of claim 10, wherein the API signature is one of a plurality of API signatures registered in association with a single kernel-space driver.

14. A system, comprising:

at least one computing device comprising at least one processor; and a memory comprising executable instructions, wherein the instructions, when executed by the at least one processor, cause the at least one computing device to at least:

define an application programming interface (API) signature for an API, the API signature specifying at least: a callback, and a callback parameter size;

query, by a user-space transport, a kernel-space dictionary to identify a match between the API signature and an API registration with the user-space transport;

create, in response to the match between the API signature and the API registration, a thread that listens for events associated with a character device;

allocate, by a kernel-space transport that resides in kernel-space, temporary storage based on the callback parameter size specified by the API signature;

store, in the temporary storage, a callback parameter; and invoke the callback based on the callback parameter, the callback being invoked by the user-space transport based on identification of an event associated with the character device.

15. The system of claim 14, wherein the instructions, when executed by the at least one processor, further cause the at least one computing device to at least:

transmit, by the kernel-space transport, a wakeup request that wakes up at least one sleeping thread maintained by a user-space library of the user-space transport, wherein the wakeup request is transmitted after the callback parameter is stored, and the at least one sleeping thread comprises the thread that listens for events associated with the character device.

16. The system of claim 14, wherein the instructions, when executed by the at least one processor, further cause the at least one computing device to at least:

determine, by the user-space transport, that an event is available based on an inspection of a poll state of the character device.

17. The system of claim 14, wherein the kernel-space transport and the user-space transport comprise a communication mechanism that allows user-space applications to communicate with kernel-space modules.

18. The system of claim 17, wherein the communication mechanism is part of a guest operating system of a virtual machine.

19. The system of claim 17, wherein the communication mechanism is part of a virtual machine manager of a hypervisor.

20. The system of claim 17, wherein the API signature is one of a plurality of API signatures registered in association with a single kernel-space driver.

* * * * *